Dec. 22, 1970              J. B. GEHMAN              3,550,106

OBJECT DETECTION SYSTEM UTILIZING ELECTROMAGNETIC WAVES

Filed July 1, 1968              3 Sheets—Sheet 1

INVENTOR.
JOHN B. GEHMAN

BY M. L. Koch    ATTY

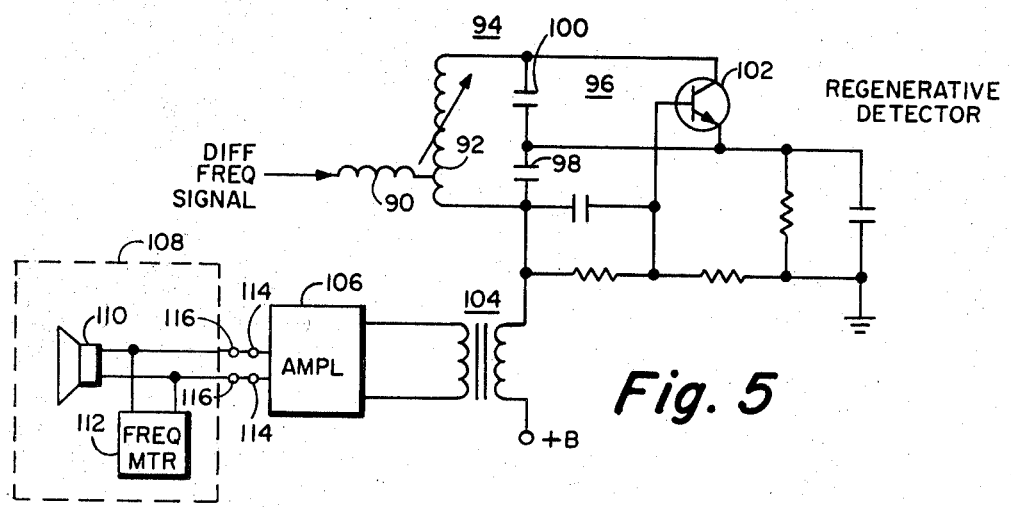
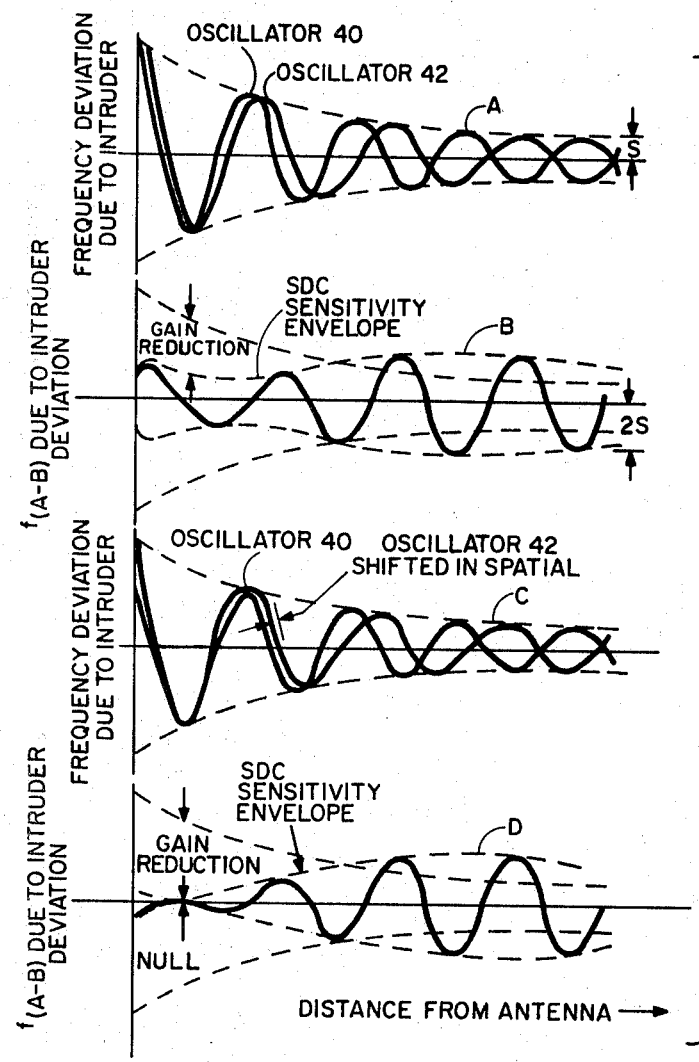

---

United States Patent Office 3,550,106
Patented Dec. 22, 1970

---

3,550,106
OBJECT DETECTION SYSTEM UTILIZING ELECTROMAGNETIC WAVES
John B. Gehman, La Jolla, Calif., assignor to General Dynamics Corporation, a corporation of Delaware
Filed July 1, 1968, Ser. No. 741,505
Int. Cl. G08b 13/24
U.S. Cl. 340—258                                   16 Claims

ABSTRACT OF THE DISCLOSURE

A sensor in the form of a whip antenna, which is unobtrusive, radiates a field by virtue of being excited by a pair of oscillators which produce frequencies in the VHF band which are offset from each other by approximately 5 to 10%. When an object enters the range over which the sensor is sensitive, the frequency of the oscillators deviates. This frequency deviation becomes cyclic as the intruder approaches or passes through the range of the sensor, which may be approximately 20 wave lengths of the oscillator frequencies. The deviation is detected by means of a receiver producing a beat note; the receiver may be located remotely from the sensor. A man walking at 4½ feet per second will frequency modulate the beat note at approximately ½ cycle per second. A vehicle traveling at 30 miles per hour will frequency modulate the beat note at 5 cycles per second. The amplitude of the note and the frequency modulation thereof is used to indicate the nature and speed of an object within the range of the sensor.

---

The present invention relates to object detection systems and more particularly to a system for detecting objects by sensing electromagnetic pertubations within the range of a sensor element.

The invention is especially suitable for use in an intrusion detection system for detecting man sized objects entering a sensing field or range. The invention may also be embodied in other systems to provide security coverage over an area. Information may also be acquired, say as to the direction of movement or speed of personnel and/or vehicles entering the secured area, as well as the number of vehicles or personnel which have entered the secured area.

Various types of electromagnetic sensing devices and intrusion detection systems have been suggested in the past. Some, as represented by the Lindsay et al. Pat. No. 2,343,987, issued Mar. 14, 1944, depend upon the induction or electrostatic field about an antenna. Thus, they are limited to a range or security coverage less than a wavelength of the electromagnetic energy which excites the antenna. The use of electromagnetic intrusion detection systems has also been limited because of an excess false alarm rate. Deviations in frequency or amplitude of the electromagnetic energy used to detect an intruder may be produced by other effects in addition to the intruder. Among these false alarm producing effects are changes in temperature, wind motion which moves the antenna with respect to the ground, humidity effects and voltage variations. Surrounding objects, such as shrubbery and buildings, may also produce false alarms. In an attempt to compensate for environmental effects, it has been proposed to utilize two oscillators. One of these drives the antenna, while the other is maintained as a reference. The beat note between the oscillators is then processed and used as a basis of detection. Inasmuch as one of the oscillators is maintained as a reference, it may be possible to compensate for fairly slowly varying environmental effects, such as changes in temperature and supply voltage. However, more rapid effects, such as wind motion of a sensing antenna or the trees and other objects within its range, nevertheless continue to produce false alarm. Another drawback of the various types of electromagnetic intrusion devices which have been suggested in the past is their great change in sensitivity throughout the requisite range. Sensitivity may increase as the sensing device is approached and small objects close to the antenna can give a false alarm. For example, a small animal passing close by sensing device of such known type would produce an indication identical to a man at the perimeter of the secured area.

Accordingly, it is an object of the present invention to provide an improved object detection system wherein the above-mentiond deficiences of known sytsems for object detection have been substantially eliminated.

It is a still further object of the present invention to provide an improved system for detecting objects by sensing electromagnetic pertubations in an electromagnetic field generated by a sensor device.

It is a still further object of the present invention to provide an improved electromagnetic object detection system which discriminates with respect to size so as to be especially sensitive to man-sized objects and to greatly reduce responses to smaller objects.

It is a still further object of the present invention to provide an improved electromagnetic detection system suitable for personnel and vehicle intrusion detection which is adapted to be remotely monitored.

It is a still further object of the present invention to provide an improved intrusion detection system having a sensor element which is unobtrusive, small in size and easily portable.

Briefly described, an object detection system embodying the invention includes a sensor and a receiver. The sensor contains an antenna which may be in the form of a whip so as to simulate a weed or sapling in the secured area. Two wave generating means, such as oscillators, are both closely coupled to the same antenna. Each operates at a frequency slightly offset from the other. The frequency offset is selected in accordance with the maximum range of the system so that the standing waves generated by each oscillator are approximately 180° out of phase at the maximum range of the omni-directional sensing field of the antenna. Thus, when an object enters the field, both oscillators shift their frequency independently and cause the difference or beat frequency to be the algebraic difference sum of both oscillator frequencies. Movement of the object through the sensing field produces a cyclical frequency modulation of the beat frequency (viz the frequency differential between the oscillator frequencies). As the detected object moves close to the sensing antenna, say within a wavelength of the transmitted waves, the frequency shift of one of the oscillators tends to be in the same direction or in phase with the frequency shift of the other oscillator. Therefore, the differential frequency does not shift. Accordingly, sensitivity is more uniform over the range and response of wind motion of the antenna, trees or other objects do not produce false alarms. Delay circuits, such as capacitors and inductors may be used to couple the oscillators. The antenna may be used to provide uniform sensitivity. The receiver which may detect the waves transmitted by the antenna or may be coupled to the oscillators by a wire line, is responsive to the differential frequency; in other words, to any deviation of the frequencies of the oscillator, and produces an indication, such as a varying pitch audible signal which can be utilized to indicate the detection of an intruder.

The invention itself, both as to its organization and method of operation, as well as additional objects and method of operation, as well as additional objects and advantages thereof will become more readily apparent from a reading of the following description in connection with the accompanying drawings in which:

FIG. 4 is a family of curves depicting the frequency deviation of the oscillator frequencies and the beat frequency therebetween with respect to distance from the sensing antenna; and FIG. 5 is a schematic diagram of a receiving system in accordance with another embodiment of the invention.

Figure 1:
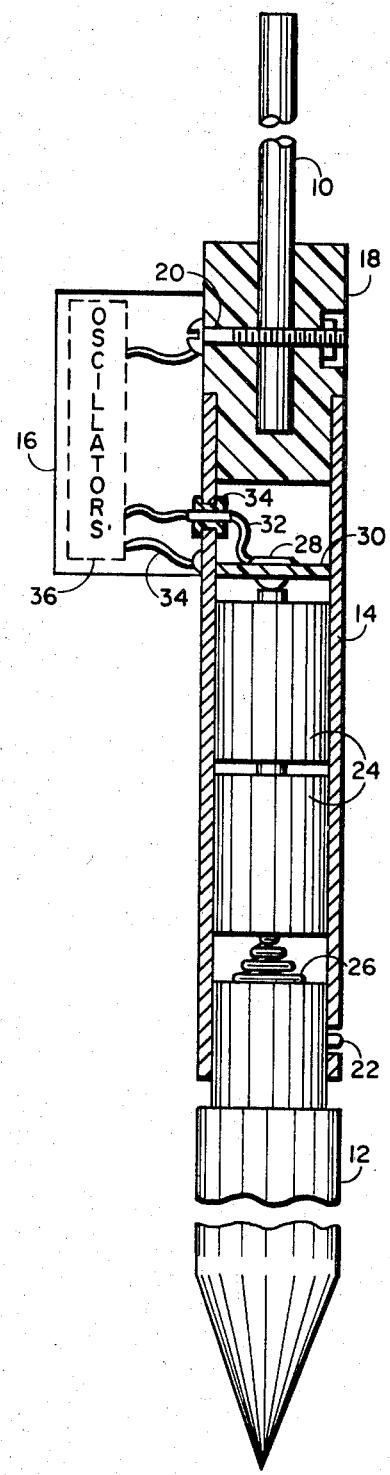
FIG. 1 is a sectional view of the sensor of a detection system embodying the invention.

Referring more paticularly to FIG. 1, there is shown the sensor and transmitter unit of an intrusion detection system embodying the invention. The principal parts of this unit are a whip antenna 10 of the monopole type, a stake 12 of conductive material which may be inserted into the ground and two cylindrical casings 14 and 16. The casing 14 is plugged at its upper end with an insulator 18 in which the antenna is mounted by means of a friction fit in a blind hole, as well as by a screw 20. The casing 14 has the stake 12 at its lower end. The stake may be removed via an offset slotted hole 22 in the casing 14. A plurality of batteries 24 is located in the casing and makes contact with the outside thereof by way of a spring 26. The positive terminal of the battery is connected to a contact 28 on an insulating disk 30. A connection 32 may be brought out of the casing 14 by way of a grommet 34. The other casing 16 may contain the circuitry of the sensor and transmitter unit which is shown as being the oscillators 36. These oscillators will be described together with the rest of the circuitry in connection wtih FIG. 2. The oscillators are connected to the antenna 10 by way of the screw 20 and receive operating power from the batteries by way of the connection 32 and another connection 34 which is made to the negative terminal of the batteries by way of the shell of the casing 14.

A typical application of this unit is to be located in the ground in the area in which security coverage is to be provided. A plurality of such units may be spaced about the perimeter of a large area, say 100' to 200' apart, in order to secure the area. The antenna 10 radiates an omnidirectional sening field, an object entering the field causes deviations in the frequency of the oscillators. The frequency differential or beat between the two oscillator frequencies varies when an object, such as a man or vehicle enters the secured area. This frequency differential varies cyclically in accordance with the speed and direction of travel of the object through the sensing field. The size and number of objects also changes the magnitude of the frequency differential. The approximate number of objects and their speed therefore may be determined in accordance with these characteristics of the frequency differential signal. The signature of the resulting signal may also be used to classify the type of vehicle or personnel which are entering the secured area.

A particular feature of the sensor and transmitter unit is that it is unobtrusive; it may also be readily camouflaged to simulate the local flora, so that it will not be detectable by an intruder. An additional feature of the invention is that the amount of radiated energy is very small and is not readily detected by intruders so that they will not be awar that the area is under security coverage. The unit may also be located within a building in order to monitor and provide security coverage of any room or other areas in the building.

Figure 2:
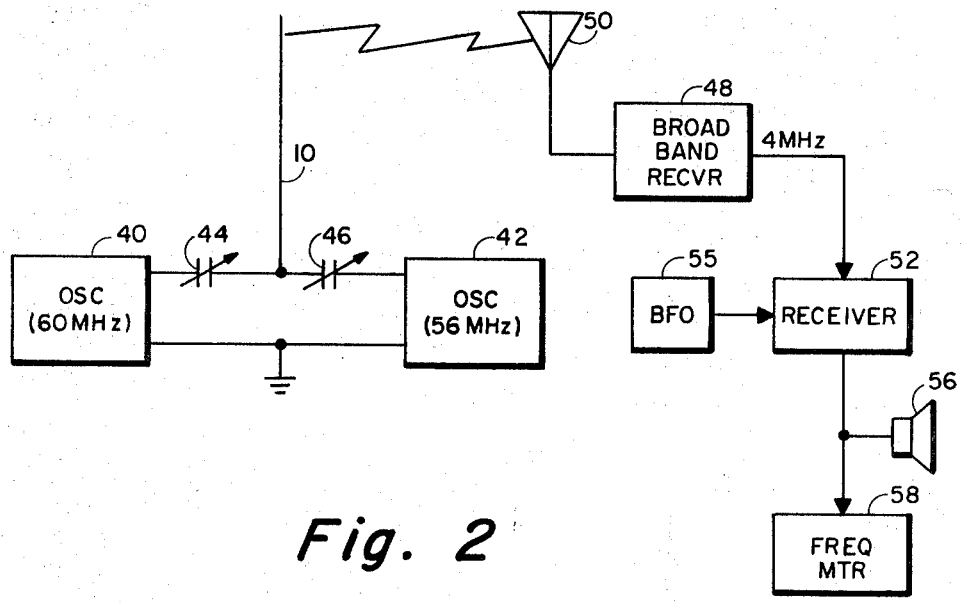
FIG. 2 is a block diagram of an object detection system embodying the invention.

FIG. 2 is a block diagram of the sensor and transmitter unit and its associated receiving unit; the latter being used to sense the radiated signal from the antenna and derive information respecting the detection of an object or intruder therefrom.

Two electromagnetic generating means in the form of an oscillator 40 and another oscillator 42 are closely coupled to the antenna by means of coupling capacitors 44 and 46 which are variable in order to adjust the phase of the antenna driving signals for reasons which will be explained more fully hereinafter. The oscillators may be returned to ground, and ground as will be apparent from FIG. 1 is also the ground plane of the antenna 10. Both oscillators are independent and act independently of one another, although they operate through and drive a single antenna which propagates and radiates a single sensing field. Both oscillators include the antenna in their frequency determining circuit, as will be discussed more fully below in connection with FIG. 3. When an object enters the sensing field, the frequency of each of the oscillators varies. In accordance with a feature of the invention, the frequency variation or deviation of the oscillators is, by virtue of the difference in wavelengths of the electromagnetic energy which they radiate, pulled in opposite directions near the perimeter of the selected secured area and pulled in the same direction at the radiating antenna by an approaching object. Thus, the sensitivity of the unit which would normally increase as the distance from the antenna decreases is modified by the above feature so as to decrease the sensitivity as the object comes within the proximity of the antenna 10. The foregoing decrease in sensitivity compensates for the increase in radiated energy as an object approaches the antenna, thus making the sensor unit have uniform sensitivity over its useable range. Inasmuch as the oscillators 40 and 42 are closely coupled to each other, a beat note or frequency differential signal will be produced. In the illustrated case where the oscillator 40 has a frequency of 60 mHz. and the oscillator 42 has a frequency of 56 mHz., these frequencies will be radiated to a receiver 48. Inasmuch as the frequency deviation of the oscillators vary independently as an object enters the sensing field, the frequency differential signal will also vary.

This differential frequency signal is generated within the broad band receiver 48 which may be coupled to an antenna 50. The broad band receiver is tuned to the differential frequency (in the instant case 4 mHz.) and has a band pass sufficient to pass the variations in the differential frequency signal. These variations may be of the order of one cycle to 100 kHz. The output of the broad band receiver is a 4 mHz.±100 kHz. signal which may be applied to another receiver 52. This receiver may be a communication receiver having a beat frequency oscillator which receives the 4 mHz. signal as though it were a continuous wave (CW signal) and translates it into an audible tone by means of the beat frequency oscillator 55 which may be contained within the receiver. This audible tone varies in frequency in accordance with the frequency deviations of the differential frequency signal and may be applied to an electrodynamic transducer, such as a speaker 56 and/or to a frequency meter 58. The frequency meter may be visually observed, as by looking at the excursions of a needle attached thereto or the tone may be heard on the speaker 56.

As an object passes through the sensing field, the frequency will deviate cyclically. The rate of this deviation is an indication of the speed of the intruding object, whether it be a vehicle or a man. The magnitude of the deviation (viz the frequency swing) is an indication of the size of the intruding object. The number of peak deviations indicates the range of the object to the antenna. At the particular frequency used, each peak represents a distance of 8⅓' from the antenna. A skilled operator can therefore recognize the nature and type and even number of intruding objects from the signature of the detected differential frequency signal.

Figure 3:
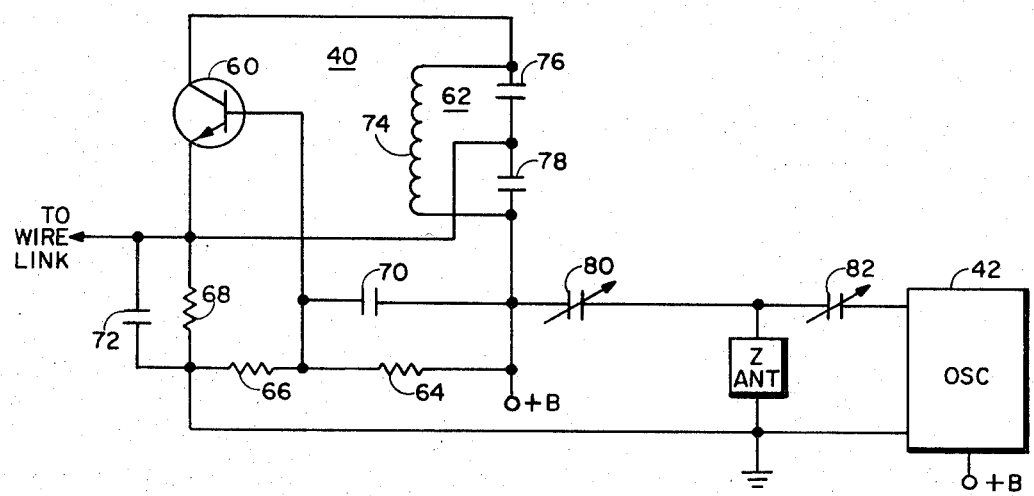
FIG. 3 is a schematic diagram showing the oscillators of the system shown in FIG. 2.

A more detailed circuit diagram of one of the oscillators 40 is shown in FIG. 3. The other oscillator 42 may be identical except for the values of the component in its frequency determining circuit which are to provide a different output frequency (i.e. 56 mHz.). The oscillator 40 therefore is representative of both oscillators and only it will be described in detail herein. This oscillator includes a transistor 60 having base, collector and emitter electrodes. A frequency determining circuit 62 in the form of a tank circuit is also provided. The transistor 60 is connected to the frequency determining circuit 62 in order to provide a Colpitts oscillator. Biasing potentials for the oscillator are obtained by way of resistors 64 and 66. The resistors 64 and 68 are by-passed by capacitors 70 and 72 respectively. The antenna 10 is effectively connected between the bottom or high impedance point of the tank circuit 62 and ground for alternating current at the oscillator frequency.

The tank circuit 62 includes an inductor 74 and a pair of capacitors 76 and 78. Inasmuch as the junction of the capacitors 76 and 78 is effectively connected to ground for A.C. current through the bypass capacitor 72, the antenna 10 is effectively connected across the capacitor 78 in the tank circuit. It is desirable that the value of capacitance of the capacitor 76 be twice that of the capacitor 78 for proper feedback and so that the principal frequenc control is provided by the combination of the impedance of the capacitor 78 and the effective impedance of the antenna 10.

Coupling capacitiors 80 and 82 define coupling circuits for coupling the antenna to the frequency determining tank circuits 62 of the oscillator 40 and the tank circuit (not shown) of the oscillator 42. These capacitors 80 and 82 are variable so as to provide phase shift or delays of one oscillator output signal with respect to the other. These capacitors 80 and 82 also provide a series impedance between the two oscillators to prevent the oscillators from locking to a single frequency.

The emitter of the transistor 60 may be connected to a wire link. This wire link may be used to carry the differential frequency signal to a receiver which is shown in FIG. 5. Of course, the radiated frequency differential signal may be used as shown in FIG. 2. Inasmuch as the oscillators 40 and 42 are closely coupled to each other by way of coupling capacitors 80 and 82, the differential frequency signal will appear concurrently with the oscillator output signal in both oscillator circuits. Inasmuch as the differential frequency signal is of lower frequency (in the instant case 4 mHz. nominal) its magnitude across the biasing circuit consisting of the capacitor 72 and the resistor 68 will be higher than the magnitude of the 60 or 56 mHz. signals which are generater by the oscillators 40 and 42. Thus, it is bypassed desirable to extract the differential frequency signal across a biasing circuit.

Referring to FIG. 5, the differential frequency signal is applied by way of a choke 90 which further aids in blocking the 56 and 60 mHz. signals to a tap on the inductor 92 of the tank circuit 94 of a beat frequency Colpitts type oscillator 96. The tank circuit 94 also includes a pair of capacitors 98 and 100 and a transistor 102. Biasing voltages are applied to the transistor 102 by way of biasing circuits similar to those described in connection with the oscillator 40 in FIG. 2. The beat frequency oscillator 102 is adjusted by way of the variable inductor 92 to have a frequency equal to the nominal frequency of the differential frequency signal. Thus, an audio beat note will appear across the tank circuit which is applied to the primary of a transformer 104. The transformer is an audio transformer; thus, it passes only the audio beat note to an amplifier 106. The amplifier is connected to a utilization system 108 which may include a speaker 110 and/or a frequency meter 112. The utilization system responds to the detection of an intruding object into the sensing field radiated by the antenna 10 by producing an audible tone which may be used, as was explained above in connection with FIG. 2. It may be desirable to connect the oscilator at the sensor unit by way of the wire link to the beat frequency oscillator 96 which together with the utilization system 108 is located at a remote point from the sensor unit. On the other hand, it may be desirable to locate the beat frequency oscillator 102 and the amplifier 106 in the same container, such as the casing 16 (FIG. 1), and run a wire line between the terminals 114 and 116 to the utilization system 108 which alone may be remotely located.

The operation of the system will not be explained in connection with FIG. 4. Curve A and curve B depict the frequency deviation of the oscillators 40 and 42 in the case of curve A and the frequency deviation of the differential frequency signal or beat frequency in the case of curve B, both for the case with the driving signals from the oscillators 40 and 48 which are applied to the antenna are not entirely in phase, due to the single antenna providing a different load to each oscillator operating on different frequencies. Curves C and D on the other hand depict the cases where the oscillator driving signals are in phase and illustrate the feature of uniform sensitivity over the range as well as decreased sensitivity at the vicinity of the antenna. The frequency offset of the oscillators is such that there will be N cyclical responses (viz half-wave lengths of the radiated waves to the target maximum range for one oscillator) (oscillator 40) and N minimum one-half cyclical responses to the maximum target range for the other oscillator 42. For example, assuming that the maximum target range is approximately 65 feet from the antenna the 60 mHz. oscillator 40 will have approximately 4 wavelengths while the other oscillator 42 will have approximately 3¾ wavelengths. In other words, 8 and 7½ standing waves; the oscillator standing wave from the higher frequency oscillator 40 will be 180° out of phase with the oscillator standing wave from the lower frequency oscillator 42. As an intruder enters the sensing field, the oscillators will be pulled or deviate their frequencies in opposite senses; thus, a spatial differential frequency or beat frequency is produced as shown in curve B which is maximum at a selected range and then decreases as the antenna is approached. Accordingly, the sensitivity of the system is enhanced and made more uniform notwithstanding the reduction in gain or signal as a function of distance from the antenna. It will be observed that as the intruder approaches the antenna the differential frequency signal shifts frequency cyclically. Thus, the rate of this shift can be used as an indication of the speed of the approaching intruder. Similarly, the magnitude of the shift is a function of the size of the intruder and may be used to discriminate large from small objects such as vehicles from men and men from animals. Further, each cycle of deviation represents about 8⅓' approach to the antenna. The pertubations in this signal also vary as a function of the number of intruders and thereby may provide an indication of the number of the intruders as well as their mode of movement.

Curves C and D illustrate the effect on the radiated signal and the differential frequency signal by virtue of the delay or coupling circuits including the capacitors 80 and 82. The cyclical responses of the oscillators 40 and 42 are shifted in phase so as to track each other. Inasmuch as the frequencies of these oscillators are different, the signature phase tracking will occur only in the immediate vicinity of the antenna. At the selected maximum target range, the radiation from the different oscillators will be 180° out of phase, as is shown in curve A. The in and out phase relation cyclically repeats every multiple of the selected maximum range. However, the selected range is usually selected to give a reasonable response whereas an extended range signal would be small and would not be useable. However, the frequency differential signal will be negligible over the first wavelength in the immediate vicinity of the antenna. Thus, null responses are found at the antenna 2d, 4d, where d is the selected maximum range. It essence, the dual signals produce a spatial beat, a sine junction extending 100' and superimposed upon the natural standing wave response, having peaks every 8⅓' where its normal envelope amplitude varies as an exponential function as the object approaches the antenna. This provides a sensitivity distance control function (SDC) which insures that the sensitivity is substantially uniform over the target range of interest but is diminished in the immediate vicinity of the antenna. Accordingly, a small object, such as a small animal which enters the immediate vicinity of the antenna does not produce a signal which could be mistaken for a man or vehicle in the vicinity of the maximum target range.

Other advantages of the differential frequency operation of the system are as noted above, improved response to objects at the maximum target range. The effect of nearby movement of bushes and trees or the swaying or whipping of the antenna itself caused, say by the wind, are also negligible in that the sensing unit is not sensitive to movement in its immediate vicinity. The system is also self-detecting in that a beat note is produced only when an intruder enters the sensing field. A frequency differential signal is also adapted more precisely tracked, thereby reducing the effect of any radio frequency interference which may be picked up by the antenna.

From the foregoing description it will be apparent that there has been provided an improved intrusion detection system having features of range and operation which were not present in previous available electromagnetic detection systems. While a few illustrative intrusion detection systems embodying the invention have been described, it will be appreciated that variations and modifications thereof will become apparent to those skilled in the art. Accordingly, the foregoing description should be taken merely as illustrative and not in any limiting sense.

What is claimed is:
1. A system for the detection of objects comprising
 (a) a single antenna for radiating a sensing field,
 (b) first means for generating electromagnetic waves,
 (c) second means for generating electromagnetic waves,
 (d) the frequencies of the waves generated by said first and second means being offset with respect to each other,
 (e) means for coupling each of said first and second means to said antenna so that the frequencies of said waves generated thereby are separately sensitive to perturbations of the sensing field radiated by said antenna, and
 (f) means responsive to the frequency differential between said waves generated by said first and second frequencies for providing an output in response to an object in said sensing field.

2. The invention as set forth in claim 1 wherein said first and second means include first and second frequency determining circuits respectively and wherein said coupling means includes first and second coupling circuits respectively connected to said first and second frequency determining circuit so as to include the effective impedance of said antenna in said circuits.

3. The invention as set forth in claim 2 wherein each of said frequency determining circuits includes a plurality of frequency determining elements, and wherein said coupling means includes at least said one circuit element connected between at least one of said side frequency determining elements and the said antenna, and means effectively connecting the other side of said frequency determining element to a point of return potential of said antenna.

4. The invention as set forth in claim 3 wherein said antenna is a monopole spaced from the ground and wherein said connecting means includes a conductive element connected to ground.

5. The invention as set forth in claim 4 wherein said monopole is a flexible rod, and wherein said conductive element is a stake adapted to be inserted into the ground, a casing mounted between said stake and said rod for containing batteries, and another casing for containing said generating means also supported by said stake.

6. The invention as set forth in claim 2 wherein said first and second coupling circuits include means for delaying the waves generated by said first and second generating means with respect to each other so that they are substantially in phase in the immediate vicinity of said antenna.

7. The invention as set forth in claim 6 wherein said delayig means includes a first capacitor connected between said antenna and said first frequecny determining circuit and a second capacitor connected between said antenna and said second frequency determining circuit.

8. The invention as set forth in claim 7 wherein said first generating means is a first oscillator and said second generating means is a second oscillator.

9. The invention as set forth in claim 8 wherein oscillators each include a transistor having emitter, collector and base electrodes, and wherein said frequency determining circuit is a tank circuit which is alternating current connected between said base and one of said emitter and collector electrodes, and wherein said coupling circuit capacitor is connected between said antenna and the end of said tank circuit which is connected to said base electrode.

10. The invention as set forth in claim 1 wherein said first and second generating means provide waves having a wavelength of the order of 10 to 30 feet, and wherein said generating means includes means for determining the wavelength of said waves so that the waves generated by said first generating means and said second generating means are about 180° out of phse with each other near the perimeter of said sensing field.

11. The invention as set forth in claim 10 wherein said means includes frequency determining circuits separately coupled to said antenna.

12. The invention as set forth in claim 1 wherein said frequency differential responsive means includes means for generating a signal having a frequency approximately equal to said frequency differential, and means responsive to the beat frequency between said signal and said frequency differential.

13. The invention as set forth in claim 12 wherein said signal generating means is a beat frequency oscillator to which one of said wave generating means is coupled, and an audio frequency responsive device coupled to said beat frequency oscillator.

14. The invention as set forth in claim 13 wherein said audio frequency responsive device is a frequency meter.

15. The invention as set forth in claim 13 wherein said audio frequency responsive device is an electrodynamic transducer which produces the beat frequency in audible form.

16. The invention as set forth in claim 1 wherein said frequency differential responsive means includes a receiver tuned to said frequency differential, and means responsive to the frequency deviation in the signal received by said receiver for indicating the detection of an object.

References Cited
UNITED STATES PATENTS

| | | | |
|---|---|---|---|
| 2,714,205 | 7/1955 | Grayson et al. | 343—7.7 |
| 2,935,728 | 5/1960 | Morgan | 340—3 |
| 3,300,768 | 1/1967 | Bystrom et al. | 340—258 |
| 3,471,845 | 10/1969 | Sokoloff | 340—258 |

ROBERT L. RICHARDSON, Primary Examiner

U.S. Cl. X.R.

325—113; 331—64, 65